(12) United States Patent
Kim et al.

(10) Patent No.: US 9,288,668 B2
(45) Date of Patent: Mar. 15, 2016

(54) METHOD FOR ALLOCATING AN IP ADDRESS TO MOBILE COMMUNICATION USER EQUIPMENT

(75) Inventors: Hyunsook Kim, Gyeonggi-Do (KR); Seondon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1085 days.

(21) Appl. No.: 13/387,645

(22) PCT Filed: Jul. 27, 2010

(86) PCT No.: PCT/KR2010/004931
§ 371 (c)(1),
(2), (4) Date: Mar. 26, 2012

(87) PCT Pub. No.: WO2011/013988
PCT Pub. Date: Feb. 3, 2011

(65) Prior Publication Data
US 2012/0179790 A1    Jul. 12, 2012

Related U.S. Application Data

(60) Provisional application No. 61/228,948, filed on Jul. 27, 2009.

(30) Foreign Application Priority Data

Jul. 26, 2010  (KR) .................. 10-2010-0072118

(51) Int. Cl.
*H04W 8/26* (2009.01)
*H04L 29/08* (2006.01)
(Continued)

(52) U.S. Cl.
CPC ................. *H04W 8/26* (2013.01); *H04L 67/22* (2013.01); *H04W 8/18* (2013.01); *H04W 80/045* (2013.01)

(58) Field of Classification Search
CPC .......... H04L 47/32; H04L 12/28; H04B 7/005
USPC .................................... 370/338, 389
See application file for complete search history.

(56) References Cited

U.S. PATENT DOCUMENTS 7,328,009 B2 * 2/2008 Takeda et al. ................. 455/424
8,139,571 B2 * 3/2012 Khalil et al. .................. 370/389
(Continued)

FOREIGN PATENT DOCUMENTS

KR   10-2006-0022437 A   3/2006
KR   10-2006-0082039 A   7/2006
(Continued)

Primary Examiner — Shaq Taha
Assistant Examiner — Sasha Cintron Pacheco
(74) Attorney, Agent, or Firm — Birch, Stewart, Kolasch & Birch, LLP

(57) ABSTRACT

Disclosed is a method of allocating an IP address in a mobile communication system. The method of allocating an IP address includes: receiving a PDN connection request message including one or more of version information indicating an IP version requested from a UE and information regarding capability of the UE; obtaining subscriber information of the UE from a subscriber information server in response to reception of the PDN connection request message; checking the IP version information included in the PDN connection request message; when an address of IPv6 is requested according to the checking of the version information, determining whether or not the UE moves frequently or substantially stationary on the basis of one or more of the subscriber information of the UE, the capability information of the UE, and a TAU (Tracking Area Update) frequency; and when the UE is substantially stationary, transmitting a request message including particular indication information indicating to maintain router information although a timer with respect to the router information expires so long as the UE belongs to a particular PDN gateway and information corresponding to an interface ID allocated for the UE, to the UE.

16 Claims, 8 Drawing Sheets

(51) Int. Cl.
  *H04L 12/28* (2006.01)
  *H04W 8/18* (2009.01)
  *H04W 80/04* (2009.01)

(56) References Cited

U.S. PATENT DOCUMENTS

| | | |
|---|---|---|
| 2006/0050674 A1 | 3/2006 | Lee et al. |
| 2007/0064653 A1 | 3/2007 | Jang et al. |
| 2008/0095154 A1 | 4/2008 | Jun et al. |
| 2009/0285179 A1* | 11/2009 | Jones et al. ............... 370/331 |
| 2009/0318147 A1* | 12/2009 | Zhang et al. ............. 455/435.1 |
| 2011/0170517 A1* | 7/2011 | Bakker et al. ............. 370/331 |

FOREIGN PATENT DOCUMENTS

| | | |
|---|---|---|
| KR | 10-2007-0031136 A | 3/2007 |
| KR | 10-2008-0036496 A | 4/2008 |

* cited by examiner

METHOD FOR ALLOCATING AN IP ADDRESS TO MOBILE COMMUNICATION USER EQUIPMENT

CROSS REFERENCE TO RELATED APPLICATIONS

This application is the National Phase of PCT/KR2010/004931 filed on Jul. 27, 2010, which claims priority under 35 U.S.C. §119(e) to U.S. Provisional Application No. 61/228,948 filed on Jul. 27, 2009 and under 35 U.S.C. §119(a) to Patent Application No. 10-2010-0072118 filed in Republic of Korea on Jul. 26, 2010, all of which are hereby expressly incorporated by reference into the present application.

TECHNICAL FIELD

The present invention relates to a method for allocating an IP address to a mobile communication terminal (or a user equipment (UE)).

BACKGROUND ART $2^{nd}$-generation mobile communication refers to transmission and reception voice as digital signals, which includes CDMA, GSM, and the like. Advancing from GSM, GPRS has been proposed, which is a technique of providing a packet switched data service on the basis of the GSM system.

$3^{rd}$-generation mobile communication refers to transmission and reception an image and data, as well as voice. 3GPP (Third Generation Partnership Project) has developed a mobile communication system (IMT-2000) technique and adopts WCDMA as a radio access technology (RAT). A combination of the IMT-2000 technique and the RAT, e.g., WCDMA, is called a universal mobile telecommunication system (UMTS) in Europe. UTRAN is the antonym for the UMTS Terrestrial Radio Access Network.

Meanwhile, with the 3rd-generation mobile communication, data traffic is anticipated to be sharply increased in the future, so standardization has been conducted to make a long-term evolution network (LTE) have a broader bandwidth.

In the LTE, an E-UMTS (Evolved-UMTS) and an E-UTRAN (Evolved-UTRAN) are used, and in the E-UTRAN, OFDMA (Orthogonal Frequency Division Multiple Access) is used as a radio access technology (RAT).

FIG. 1 is a view showing a network architecture of the E-UMTS (Evolved Universal Mobile Telecommunications System), a mobile communication system to which the related art and the present invention are applied.

As can be seen from FIG. 1, the E-UMTS system has been evolved from an existing UMTS system, for which the 3GPP is proceeding with the preparation of the basic specifications applicable thereto. The E-UMTS system may be classified as an LTE (Long Term Evolution) system.

The E-UMTS network can be divided into an E-UTRAN and a core network (CN). The E-UTRAN includes a terminal (referred to as 'UE (User Equipment) 10, hereinafter), base stations (referred to as eNode Bs, hereinafter) 21, 22, and 23, (referred to as '20', hereinafter), a serving gateway (S-GW) 32 located at an end of a network and connected to an external network, and a mobility management entity (MME) 31 that manages or controls mobility of the UE. One or more cells may exist for a single eNode B 20.

The base station, e.g., the eNode B manages radio resources of one or more cells, and a single cell is set to have one of bandwidths such as 1.25, 2.5, 5, 10, and 20 MHz and provides uplink or downlink transmission service to numerous UEs. In this case, different cells may be set to provide different bandwidths. Cells may be configured to geographically overlap with each other by using a number of frequencies. The base station (or eNode B) 20 provides basic information for accessing a network by using system information (SI) to the UE 10. The SI includes essential information the UE should know to access the base station 20. Thus, the UE 10 is required to receive all the SI before accessing the base station 20, and also, the UE 10 is required to have the latest SI all the time. Also, since the SI is information every UE within a single cell should retain, the base station 20 periodically transmits the SI.

FIG. 2 shows an exemplary structure of a radio interface protocol in a control plane between the UE and the base station, and FIG. 3 shows an exemplary structure of a radio interface protocol in a user plane between the UE and the base station.

The radio interface protocols are based on the 3GPP radio access network standards. The radio interface protocol has horizontal layers comprising a physical layer, a data link layer, and a network layer, and has vertical planes comprising a user plane (U-plane) for transmitting data information and a control plane (C-plane) for transmitting control signals (signaling).

The protocol layers can be categorized as a first layer (L1), a second layer (L2), and a third layer (L3) based on three lower layers of an open system interconnection (OSI) standard model widely known in the communication system.

The layers of the radio protocol control plane of FIG. 2 and those of the radio protocol user plane will be described as follows.

The physical layer, the first layer, provides an information transfer service by using a physical channel. The physical layer and an upper layer called a medium access control (MAC) layer are connected via a transport channel. Data is transferred between the MAC layer and the physical layer via the transport channel. Between different physical layers, namely, between a physical layer of a transmitting side and that of a receiving side, data is transferred, via the physical channel.

The physical channel is composed of a number of subframes present in a time axis and a number of subcarriers present in a frequency axis. Here, a single subframe includes a plurality of symbols and a plurality of subcarriers in the time axis. A single subframe includes a plurality of resource blocks, and a single resource bock includes a plurality of symbols and a plurality of subcarriers. A single resource block is called a slot and has a length of 0.5 ms temporally. A TTI (Transmission Time Interval), a unit time during which data is transmitted, is 1 ms which corresponds to a single subframe.

Physical channels existing in the physical layers of a transmitter and a receiver include an SCH (Synchronization Channel), a PCCPCH (Primary Common Control Physical Channel), an SCCPCH (Secondary Common Control Physical Channel), a DPCH (Dedicated Physical Channel), a PICH (Paging Indicator Channel), a PRACH (Physical Random Access Channel), a PDCCH (Physical Downlink Control Channel), and a PDSCH (Physical Downlink Shared Channel).

The MAC layer, the second layer, is connected with the physical layer through a transport layer, and connected to an upper layer called a radio link control (RLC) layer via a logical channel.

A downlink transport channel for transmitting data from the network to the UE includes a broadcast channel (BCH) for transmitting system information, a paging channel (PCH) for transmitting a paging message, and a downlink shared channel (DL-SCH) for transmitting user traffic or a control message. The downlink multicast, traffic of a broadcast service, or a control message may be transmitted via the downlink SCH or a separate downlink MCH (Multicast Channel). An uplink transport channel for transmitting data from the UE to the network includes a random access channel (RACH) for transmitting an initial control message and an uplink SCH for transmitting other user traffic or a control message.

The logical channel is divided into a control channel that transmits information of the control plane and a traffic channel that transmits information of the user plane according to a type of transmitted information.

The logical channels, which are at an upper position than the transport channel and mapped to the transport channel, include a BCCH (Broadcast Channel), a PCCH (Paging Control Channel), a CCCH (Common Control Channel), an MCCH (Multicast Control Channel), an MTCH (Multicast Traffic Channel), a DCCH (Dedicated Control Channel), and the like.

An RLC (Radio Resource Control) layer, the second layer, supports reliable data transmission, guarantees quality of service (QoS) of each radio bearer (RB), and is responsible for (or handles) data transmission. In order to guarantee RB-specific QoS, the RLC has one or two independent RLC entities for each RB, and in order to support various types of QoS, the RLC layer provides three RLC modes: a TM (Transparent Mode); a UM (Unacknowledged Mode); and an AM (Acknowledged Mode).

A packet data convergence protocol (PDCP) layer, the second layer, performs a function called header compression that reduces the size of a header of an IP packet, which is relatively large and includes unnecessary control information, in order to effectively transmit the IP packet such as an IPv4 or IPv6 in a radio interface having a smaller bandwidth. Also, the PDCP layer is used to cipher data of the C-plane, e.g., an RRC message. The PCP layer also ciphers data of the U-plane.

A radio resource control (RRC) layer located at the uppermost portion of the third layer is defined only in the control plane, and controls a logical channel, a transport channel, and a physical channel in relation to configuration, reconfiguration, and the release or cancellation of radio bearers (RBs). In this case, the RBs refer to a service provided by the second layers of the radio protocol for data transmission between the UE and the E-UTRAN.

When there is an RRC connection between the RRC of the UE and the RRC layer of the wireless network, the UE is in an RRC-connected mode, or otherwise, the UE is in an idle mode.

A non-access stratum (NAS) layer positioned at an upper portion of the RRC layer performs functions such as session management, mobility management, and the like.

The NAS layer illustrated in FIG. 2 will be described in detail.

An eSM (evolved session management) that belongs to the NAS layer performs a function such as a default bearer management, a dedicated bearer management, or the like, and is responsible for (or handles) controlling to allow the UE to use a PS service in a network. Default bearer resource has characteristics in that it is allocated from a network when the UE first accesses a particular packet data network (PDN). In this case, the network allocates an IP address that may be used by the UE to allow the UE to use a data service, and also allocates QoS of a default bearer. In LTE, two types of bearers, i.e., a bearer having guaranteed bit rate (GBR) QoS characteristics that guarantee a particular band width for a data transmission and reception and a non-GBR bearer having best effort QoS characteristics without guaranteeing a bandwidth, are supported. In the case of the default bearer, the non-GBR bearer is allocated. In the case of a dedicated bearer, a bearer having the QoS characteristics of the non-GBR is allocated.

The bearer allocated to the UE by the network is called an evolved packet service (EPS) bearer, and when the network allocates the EPS bearer, the network allocates an ID. This is called an EPS bearer ID. A single EPS bearer has QoS characteristics of a maximum bit rate (MBR) or/and guaranteed bit rate (GBR).

FIG. 4 is an exemplary view showing a relationship between a PDCCH (Physical Downlink Control Channel) and a PDSCH (Physical Downlink Shared Channel), i.e., channels from a base station to a UE.

As can be seen with reference to FIG. 4, in the downward direction from the base station to the UE, the physical channels include the two types of channels, i.e., the PDCCH and the PDSCH.

Via the PDCCH, control information, which is not directly connected with transmission of user data and is required for operating a physical channel, is transmitted. In brief, the PDCCH is used for controlling other physical channels. In particular, the PDCCH is used to transmit information required for receiving the PDSCH. When data is transmitted by using a certain particular frequency band at a certain particular point in time, information regarding which of UEs the data is transmitted for, what size it is, and the like, is transmitted via the PDCCH. Thus, each UE receives the PDCCH at a particular transmit time interval (TTI), and checks whether or not data to be received by each UE is transmitted. When the information indicates that data to be received by each UE is transmitted, each UE receives the PDSCH by using information such as frequency, or the like, indicated by the PDCCH. Namely, information regarding to which UE(s) (one or a plurality of UEs) the data of the PDSCH is to be transmitted, information regarding how the UEs is to receive the data of the PDSCH and decode the same, and the like, may be included in the physical channel PDCCH and transmitted.

Meanwhile, the afore-mentioned mobile communication system provides a service by using a packet switching (PS) technique, and for this PS service, user data is transmitted and received by using an IP among techniques belonging to three network layers in the OSI seven layers.

FIG. 5 is an exemplary view showing an allocation of an Internet protocol (IP) in the system illustrated in FIG. 1.

In FIG. 5, the S-GW (Serving Gateway) 32 and a P-GW (PDN Gateway) 41 serve to provide a data service to the UE, the S-GW 32 serves to transmit and receive user data to and from the UE 10, the P-GW 41 is connected to an external network (e.g., a public Internet) to allow the user to receive a service from a peer entity (e.g., an ftp server). In detail, the P-GW 41 executes an IP allocation function and a DHCPv4 function, and in order to transfer traffic of the UE 10 to the external network, the P-GW 41 serves as a default router allowing the UE 10 to receive an IP service. Also, when the P-GW 41 is within a distance of one hop from the UE 10 connected to the external network, the P-GW 41 serves as an access router.

In order to receive a service in the network, the UE 10 registers its ID (e.g., IMSI) to the network through an attach procedure, to thereby receive a service. During the attach procedure, a default bearer activation is performed through a PDN connectivity procedure, and during this procedure, the UE is allocated an IP address. The default bearer refers to an EPS bearer which is first activated for a new PDN connection, and is maintained in a set state during a life span of the PDN connection.

A connection establishment procedure for a data transmission and reception with the PDN GW by using an IPv4 will be described with reference to FIG. 5.

The UE 10 transmits an Attach Request message to the MME 31. At this time, the Attach Request message may include a PDN Connectivity Request message. Or, the Attach Request may include an APN (Access Point Name). Also, the Attach Request includes information regarding the IPv4, a PDN connection type. When the UE does not include the APN, the network may determine a default APN based on subscriber information of the UE to establish a PDN connection. Or, for the purpose of security, the UE 10 may not include the APN in the Attach Request message and transmit the Attach Request message without the APN after security is activated in a Protocol Configuration Option. z Then, the MME 31 establishes a PDN connection with the first PDN GW 41. And, the MME 31 designates an IPv4 address for the UE. And then, the MME 31 transmits an Attach Accept message to the UE. The Attach Accept message may include an Activate Default EPS Bearer Context Request message. The Activate Default EPS Bearer Context Request message includes an address of the IPv4.

The UE 10 transmits an Attach Complete message to the MME 31. The Attach Complete message includes an Activate Default EPS Bearer Context Accept message.

And then, the UE sets the address of IPv4. In this manner, a data path is established by using the address of IPv4.

Meanwhile, when the UE wants to transmit and receive by using an address of a different IPv4, the UE 10 transmits a PDN connectivity request to the MM3 31 to thereby establish a connection with a second PDN GW 42, and is allocated an address of the different IPv4. At this time, in order to establish a connection with the second PDN GW 42, an APN different from the APN used in the first connection should be used.

DISCLOSURE

Technical Problem

In the foregoing related art, the UE may be allocated the address of IPv4 to perform a data service.

However, in the foregoing mobile communication system, a procedure for the UE to be allocated an address of IPv6 is not specifically presented. Thus, in the current mobile communication system, an address of IPv6 is not used.

Therefore, an object of the present invention is to solve the foregoing problems. Specifically, an object of the present invention is to make an address of IPv6 allocated.

Meanwhile, since the address of IPv6 is a protocol for wired communication, an object of the present invention is to provide a scheme for allocating an address of IPv6 appropriately for a mobile communication system and a method for operating a UE accordingly.

Technical Solution

According to an aspect of the present invention, there is provided a method of allocating an IP address in a mobile communication system. The method of allocating an IP address, includes: receiving a PDN connection request message including one or more of version information indicating an IP version requested from a UE and information regarding capability of the UE; obtaining subscriber information of the UE from a subscriber information server in response to reception of the PDN connection request message; checking the IP version information included in the PDN connection request message; when an address of IPv6 is requested according to the checking of the version information, determining whether or not the UE moves frequently or substantially stationary on the basis of one or more of the subscriber information of the UE, the capability information of the UE, and a TAU (Tracking Area Update) frequency; and when the UE is substantially stationary, transmitting a request message including particular indication information indicating to maintain router information although a timer with respect to the router information expires so long as the UE belongs to a particular PDN gateway and information corresponding to an interface ID allocated for the UE, to the UE. Here, the interface ID may be used to configure the address of IPv6 for the UE.

A parameter indicating a type of the UE may be further included in the subscriber information of the UE. Alternatively, the capability information may further include a parameter indicating a type of the UE. The parameter may indicate whether or not the UE is a static type UE that does not substantially move or a mobile type UE that moves frequently.

The method may further include: when the UE does not substantially move (or is stationary), transmitting the particular indication information indicating to maintain router information although a timer with respect to the router information expires so long as the UE belongs to a particular PDN gateway, to the PDN gateway.

The transmitting to the UE and the transmitting to the PDN gateway may be simultaneously performed, or the transmitting to the UE may be performed before the transmitting to the PDN gateway or may be performed after the transmitting to the PDN gateway.

The PDN connection request message may be included in an Attach Request message and received.

The request message may be an Activate Default EPS Bearer Context Request message, and the Activate Default EPS Bearer Context Request message may be included in an Attach Accept message and received.

The method of allocating the IP address may further include receiving an Attach Complete message from the UE.

The PDN connection request message may further include an APN (Access Point Name).

According to another aspect of the present invention, there is provided a method of receiving an allocated IP address by a mobile communication UE. The method of receiving an allocated IP address, includes: transmitting, by a mobile communication UE, a PDN connection request message, to an entity in a network, the PDN connection request message include one or more of version information indicating an IP version requested by the mobile communication UE and information regarding capability of the UE; receiving a request message including particular indication information indicating to maintain router information although a timer with respect to the router information expires so long as the UE belongs to a particular PDN gateway and information corresponding to an interface ID from the network entity; transmitting, by the mobile communication UE, an accept message to the network entity; generating, by the mobile communication UE, an LLA (Link Local Address) by using the interface ID; receiving a router advertisement message from a router in the network, the router advertisement message including information regarding a prefix address part of an address of an IPv6, the router information, and a lifetime information regarding the router information; setting an address of IPv6 by using the prefix address and the interface ID; and transmitting uplink data to the router on the basis of the particular indication information although the lifespan with respect to the router information expires.

According to another aspect of the present invention, there is provided a control entity of a network. The control entity of the network may include a transceiver unit; and a processor. The processor may perform: receiving a PDN connection request message including one or more of version information indicating an IP version requested from a mobile communication UE and information regarding capability of the UE; obtaining subscriber information of the UE from a subscriber information server in response to the reception of the PDN connection request message; checking IP version information included in the PDN connection request message; determining whether or not the UE moves frequently or substantially stationary on the basis of one or more of the subscriber information of the UE, the capability information of the UE, and a TAU (Tracking Area Update) frequency; and when the UE is substantially stationary, transmitting a request message including particular indication information indicating to maintain router information although a timer with respect to the router information expires so long as the UE belongs to a particular PDN gateway and information corresponding to an interface ID allocated for the UE, to the UE.

The control entity may be an MME (Mobility Management Entity).

Advantageous Effects

According to embodiments of the present invention, when a UE and a network performs data transmission and reception by using an IPv6, an unnecessary ICMP message is prevented from being generated to update validity of a router.

Also, in an embodiment of the present invention, a network transmits indication information for enabling information of a router (e.g., a PDN GW) allocated by 'Router Advertisement' to be continuously used, regardless of a 'Router Lifetime' value included in a 'Router Advertisement' message, to a UE, and the UE may transmit and receive IPv6 data to a router with no limitations of the 'Router Lifetime'. Thus, the mobile communication network prevents the ICMP message such as the 'Router Advertisement' required for updating validity of router information from being transmitted to the UE, thereby reducing unnecessary overhead with respect to the use of radio resource and allocating more radio resource to users, thus enhancing quality of service (QoS).

BEST MODES

Figure 1:
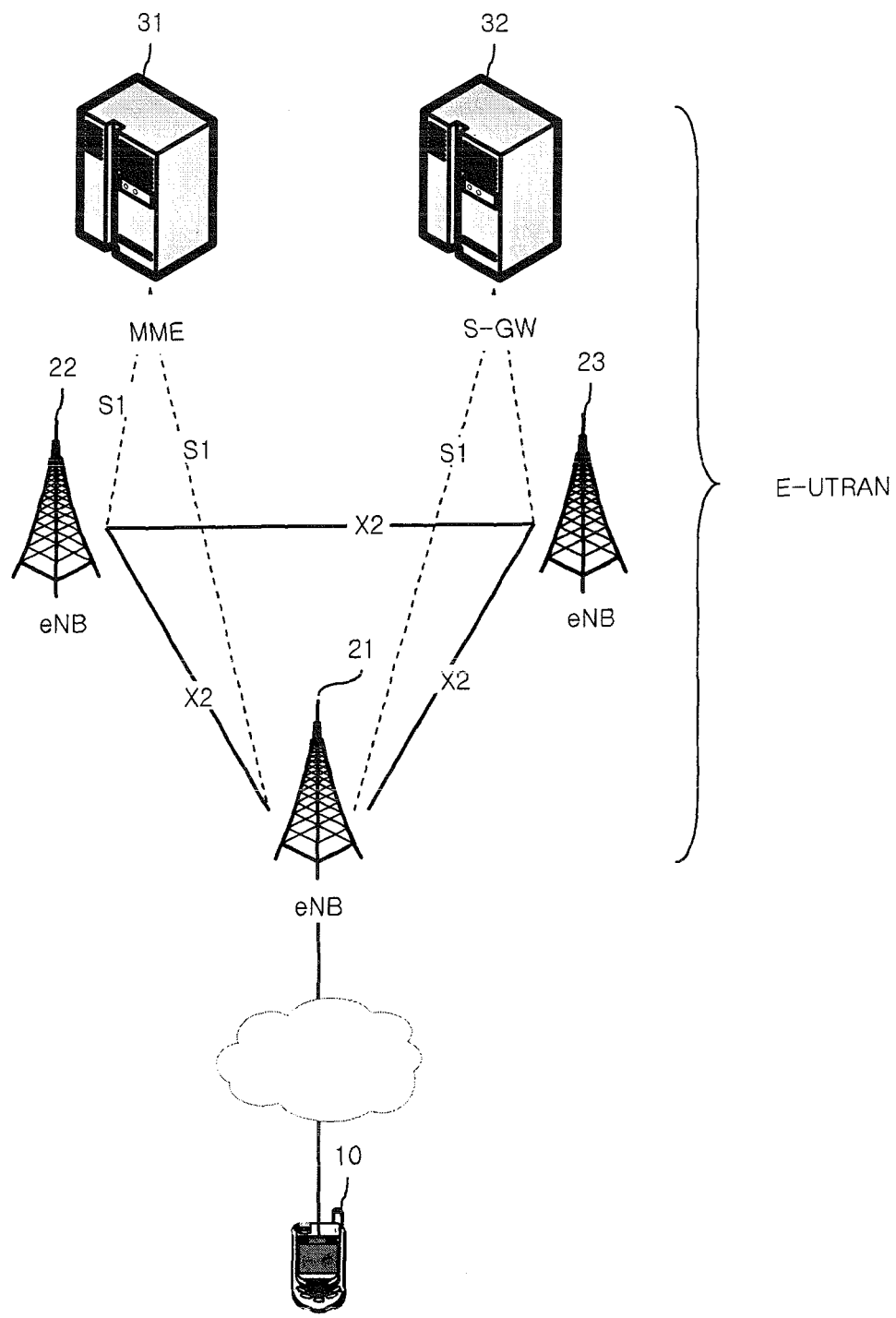
FIG. 1 is a view showing a network architecture of the E-UMTS (Evolved Universal Mobile Telecommunications System), a mobile communication system to which the related art and the present invention are applied.
Figure 2:
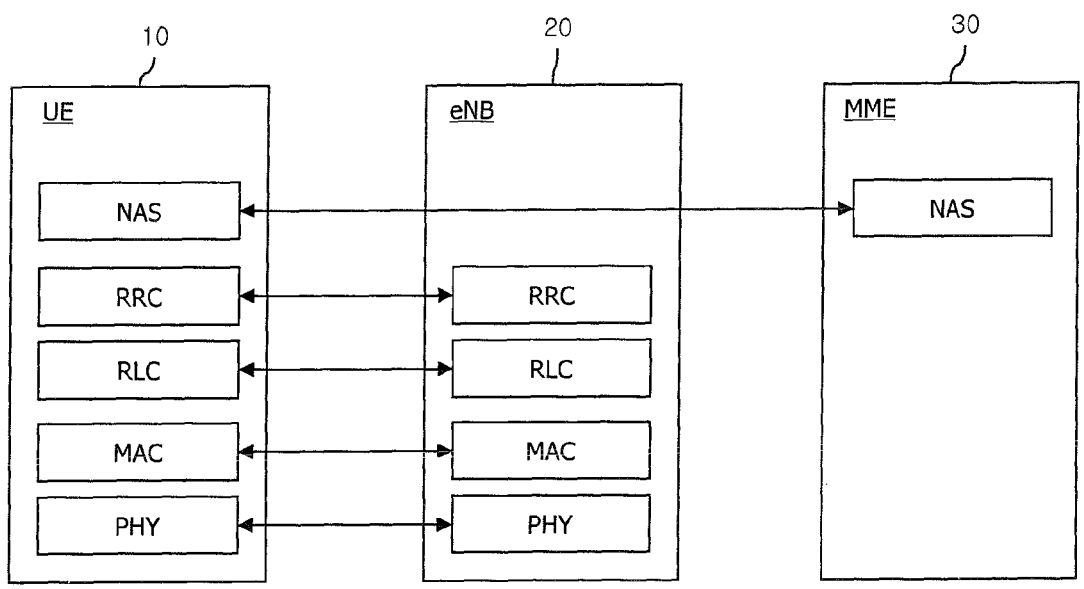
FIG. 2 shows an exemplary structure of a radio interface protocol in a control plane between the UE and the base station.
Figure 3:
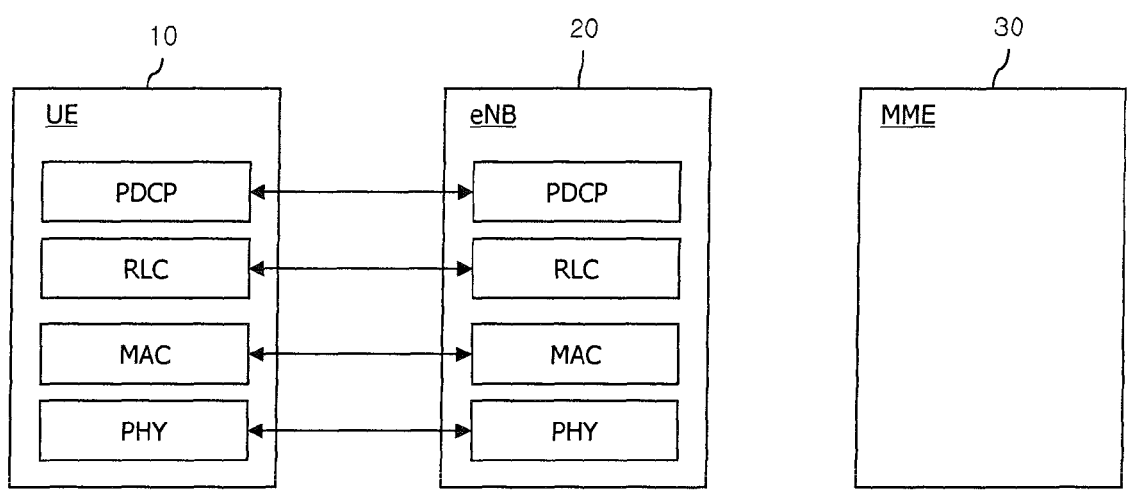
FIG. 3 shows an exemplary structure of a radio interface protocol in a user plane between the UE and the base station.
Figure 4:
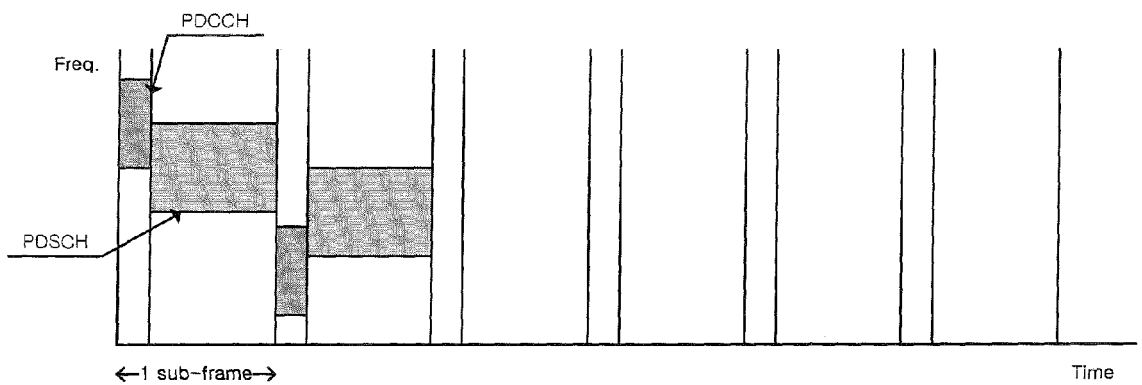
FIG. 4 is an exemplary view showing a relationship between a PDCCH (Physical Downlink Control Channel) and a PDSCH (Physical Downlink Shared Channel) as channels from a base station to a UE.
Figure 5:
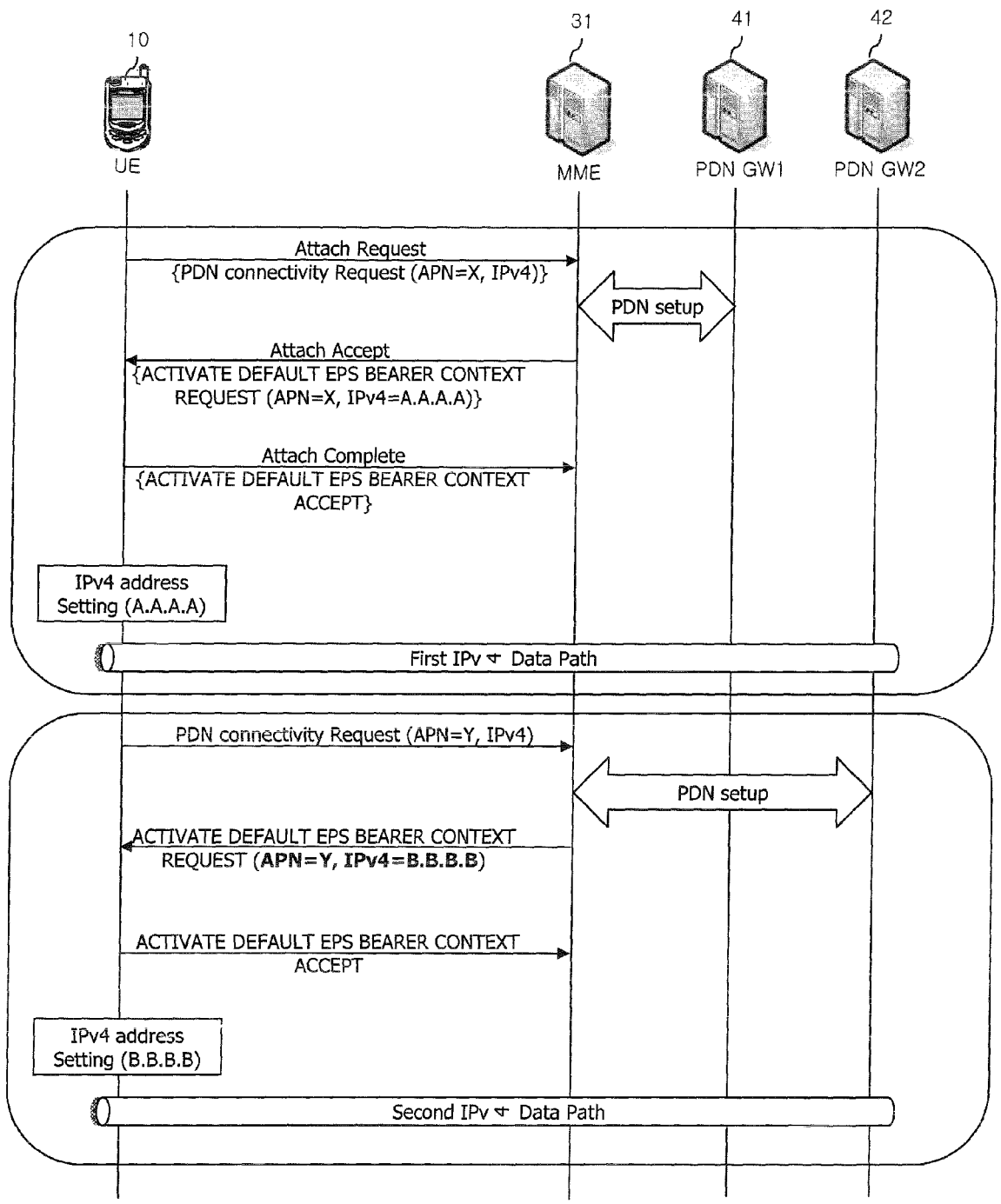
FIG. 5 is an exemplary view showing an allocation of an Internet protocol (IP) in the system illustrated in FIG. 1.

The present invention is applied to LTE. However, the present invention is not limited thereto and may be applied to any communication systems and methods to which the technical concept or idea of the present invention is applicable.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

Hereafter, a term of UE is used, but the UE may be called by other names such as UE (User Equipment), ME (Mobile Equipment), or MS (Mobile Station). Also, the UE may be a portable device having a communication function such as a mobile phone, a PDA, a smart phone, a notebook computer, and the like, or may be a device which is not portable such as a PC or a vehicle-mount device.

Figure 6:
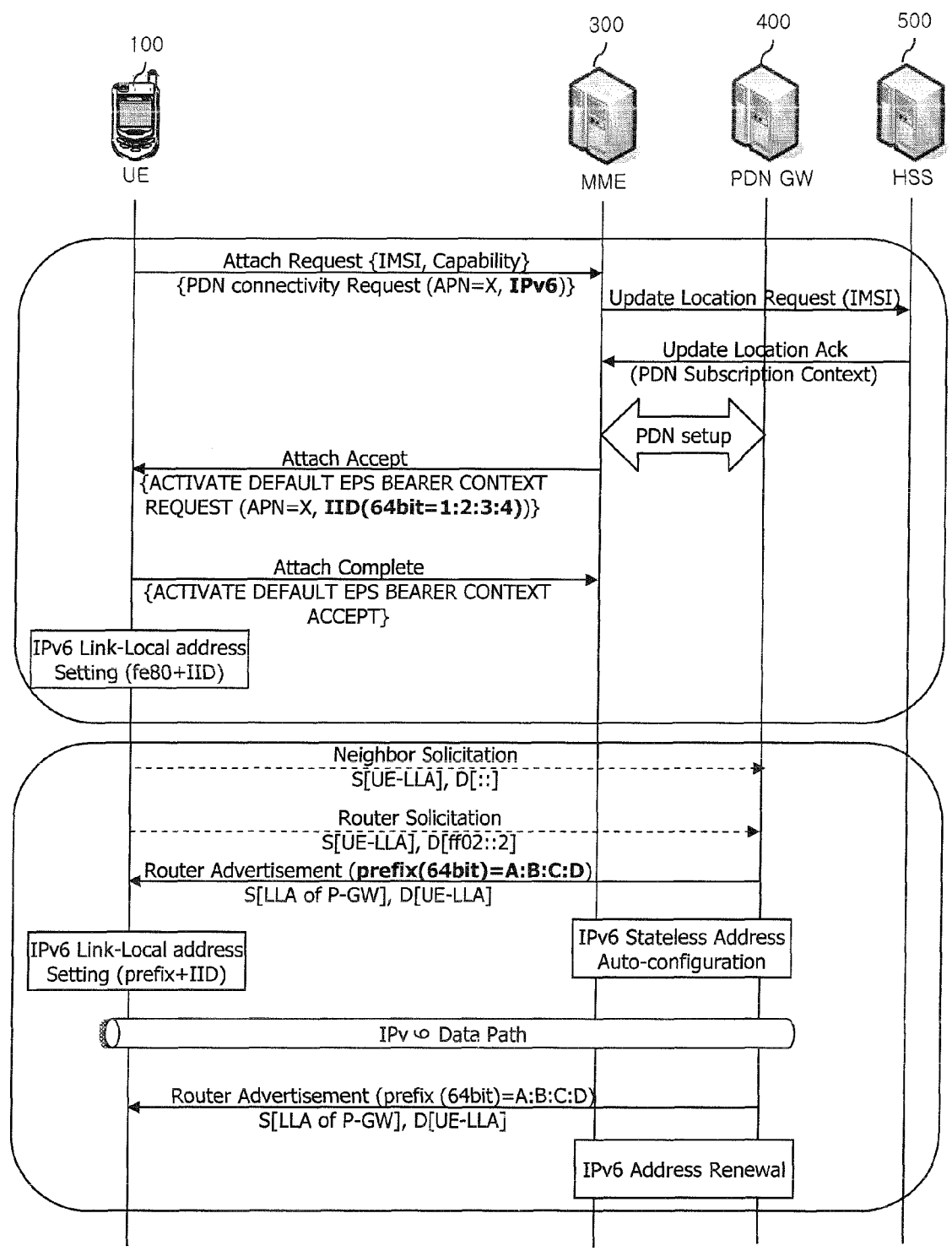
FIG. 6 is a signal flow chart illustrating a method of allocating an IPv6 in a mobile communication system.

FIG. 6 is a signal flow chart illustrating a method of allocating an IPv6 in a mobile communication system.

Basically, a mobile communication system, e.g., LTE (Long Term Evolution0 uses IPv6 Stateless Address Autoconfiguration defined (e.g., RFC4862) in RFC, and provides a method of allocating an IPv6 address to a UE, with some limitations. For example, hereafter, a method of allocating an IPv6 address through an Attach procedure including a default bearer activation will be described.

1) First, in order to receive a data service, the UE 100 transmits an Attach Request message including identification information of the UE 100, e.g., IMSI (International Mobile Subscriber Identify) and information regarding capability of the UE 100 to the MME 300. The information regarding the capability is included in the Attach Request message in order to inform the MME 300 about the characteristics of the UE 100. The information regarding the capability may be, for example, a ciphering algorithm to be used for a data transmission and reception. Meanwhile, the Attach Request message may include a PDN Connectivity Request message. The PDN Connectivity Request message includes an APN and a PDN type parameter. The PDN type parameter may include requested IP version information, e.g., IPv6.

2) In order to register a current location of the UE 100, the MME 300 transmits information regarding the UE 100, e.g., identification information of the UE 100, to an HSS (Home Subscriber Server) 500, thus performing registration. This process may be omitted when the MME is not changed at a timing at which the UE accesses the network.

3) Then, the HSS 500 transfers a location update response message, e.g., Update Location Ack message, including the UE subscriber information to the MME 300. The subscriber information may be, for example, information such as an IP address that may be used by the UE 100, a PDN type, and the like.

4) Then, the MME 300 enables a PDN GW 400 and an S-GW (not shown) to generate a default bearer on the basis of the received subscriber information (e.g., a PDN type) and the access information (e.g., a PDN type) requested by the UE. While the default bearer is being generated, the MME 300 obtains information for the UE 100, e.g., an interface ID (IID) included in an address of IPv6. Here, as described above, since the UE has requested IPv6, the PDN GW 400 allocates the IID included in the address of IPv6 to the UE.

And, the MME 300 transmits an Attach Accept message to the UE. The Attach Accept message may include an Activate Default EPS Bearer Context Request message. The Activate Default EPS Bearer Context Request message may include an APN and an IID.

5) When the UE 100 receives the Attach Accept message, the UE 100 transmits an Attach Complete message to the MME 300. The Attach Complete message may include an Activate Default EPS Bearer Context Accept message.

Meanwhile, the UE 100 checks the Activate Default EPS Bearer Context Request message included in the Attach Accept message, and generates an IPv6 address (64 bit prefix+64 bit IID) having 128 bits by using certain 64-bit prefix (e.g., fe80::). The address of IPv6 thusly generated is a Link-Local Address (LLA). The UE 100 can communicate with a different UE (or a router) that belongs to the same subnet (or the same network link) by using the LLA. For example, when the IID value is 1:2:3:4, the LLA value generated by the UE 100 is fe80::1:2:3:4.

For reference, the address of IPv4 has a size of 16 bits, the display method has a four-digit value discriminated by '.' (dot) like 2341.128.2.1, and one digit value has a decimal value of 0-255, while the address of IPv6 has a size of 128 bits, a display method has an 8-digit value discriminated by ':' (colon) like 2001:a121:e43:f2e4:2e0:91ff:fe10:4f5b, and one digit value has a form of hexadecimal number having a size of 16 bits. In this case, with respect to a value 0 which is continued like 2001:0:0:0:2e0:91ff:fe10:4f5b, '::' (double colon) is used. Namely, it means that a value 2001::2e0:91ff:fe10:4f5b is the same address as 2001:0:0:0:2e0:91ff:fe10:4f5b.

6) Meanwhile, when the UE 100 generates the address of IPv6, in order to perform duplicate address detection (DAD), namely, a procedure for checking whether or not the generated address overlaps with an adjacent UE according to RFC standard, the UE 100 transmits a Neighbor Solicitation (NS) message including an unspecified address ('::') designated as a destination address and the address (e.g., A::B) generated by the UE, as a source address, to the PDN-GW 400. After transmitting the NS, when the UE receives a Neighbor Advertisement (NA) from a different UE (or router) before a particular time, the UE checks the source address included in the NA. When the source address (e.g., A::B) included in the NA is identical to the LLA address which was generated by the UE 100, since it means that another UE using the identical address to that of the UE 100 exists in the same network, the UE 100 performs a procedure for generating a different address.

7) The UE 100 receives a Router Advertisement (RA) message from the PDN-GW 400. The RA message may include the address of the PDN-GW 400 as a source address, and the LLA of the UE 100 as a destination address. The RA message may include a prefix of IPv6.

Meanwhile, the RA message may be periodically transmitted to the UE 100.

Or, in order to check a router, the UE 100 may transmit a Router Solicitation (RS) message as illustrated to the PDN-GW 400 and receive an RA in response thereto. The router Solicitation (RS) message may be configured as shown in Table 1 below.

TABLE 1

| Router Solicitation |
| --- |
| Type (8 bit): 133 (RS has a value of 133) |
| Code (8 bit): 0 |
| Checksum (16 bit): ICMP checksum (checksum for inspecting message integrity) |
| Option |
| Source link-layer address: Address of a source L2 layer (For example, in case of a computer using a windows system performing Ethernet communication, a MAC address is used.) |

The UE 100 and the PDN-GW 400 belong to the same sub-network of 1-hop distance, and the RS message and the RA message may use LLA as a source address and a destination address. When the UE 100 transmits the RS message, the destination address (ff02::2) in the RS message indicates all of routers in a link local (link-local scope all-routers multicast address). FIG. 6 shows a case in which, when the UE 100 transmits the RS message, it uses ff02::2 in order to obtain the RA because the UE does not know a destination address. Here, the PDN-GW 400 receives the RS message from the UE 100, and since the source address of the received RS message uses the IID value allocated by the PDN-GW 400, the PDN-GW 400 includes a prefix value corresponding to the received IID value in the RA message and transmits the same. This process is also called a router discovery process in the RFC.

8) Meanwhile, the UE 100 generates a 128-bit global address by using the 64-bit prefix value included in the received RA message and the allocated 64-bit IID value.

Up to now, the allocation of the address of IPv6 has been described according to the RFC standard. In this respect, however, in LTE, the PDN-GW allocates a globally unique prefix to the UE. Also, in LTE, the IID value allocated from the PDN-GW should be necessarily used. However, alternatively, the IID value may not be allocated by the PDN-GW and a value arbitrarily generated by the UE may be used as the IID value.

9) Meanwhile, the PDN-GW periodically transmits a Router Advertisement message to the UE in order to update validity of the address of IPv6 allocated to the UE.

TABLE 2

Router Advertisement

| | |
|---|---|
| 1) Type (8 bit) | :134 |
| 2) Code (8 bit) | 0 |
| 3) Checksum (16 bit) | ICMP checksum |
| 4) Cur Hop Limit (8 bit) | Value for designating Hop Limit value of IPv6 header |
| 5) M (1 bit) | Value for 'Managed address configuration' 0: indicates IPv6 address allocation through IPv6 SLAAC 1: indicates IPv6 address allocation through DHCPv6 This value should be 0 all the time because IPv6 SLACC is used as an IPv6 address allocation technique in LTE |
| 6) 0 (1 bit) | Value for 'Other configuration' (indicates whether to set a configuration value other than a UE address through DHCPv6 (e.g., DSN server address)). 0: Value other than address is not set by using DHCPv6 1: Value other than address is set by using DHCPv6 |
| 7) Reserved (6 bit) | Not used |
| 8) Router Lifetime (16 bit) | indicates a lifetime as a default router. Through the default router, the UE may transmit and receive IPv6 data to and from an external different UE. To this end, the UE maintains default information for communicating through the default router (e.g., in case of a computer performing wired communication using Ethernet that uses a windows operating system, the computer maintains a Link-local address and an L2 address (e.g., an IEEE 802.3 Ethernet MAC address) of the default router to transmit data to a destination address of a MAC header of a packet transmitted to the outside by using the address of the default router). has values ranging from 0 to 65,535 as second unit values. Namely, after the UE may be allocated an IPv6 address through the IPv6 SLACC procedure during about 18.2 hours, the UE may perform data transmission and reception through the default router during router lifetime. In case of value 0, the UE cannot transmit and receive data through the default router. Value 0 may be used for the purpose of preventing a UE to which a router is connected from communicating with the router. A router transmits an RA message to the UE at particular periods, and the UE resets (or refreshes) the lifetime of the default router by using the RA received from the router. Or, the |

TABLE 2-continued

Router Advertisement

| | |
|---|---|
| | UE may perform a procedure (i.e., Neighbor Unreachability Detection) of transmitting Neighbor Solicitation and receiving Neighbor Advertisement, or transmit RS and receive RA as a result, to reset the lifetime. In LTE, PDN GW serves as default router. |
| 9) Reachable Time (32 bit) | It is used for Neighbor Unreachability Detection (NUD) for detecting whether or not a neighbor node (e.g., a UE or a router) is reachable. After receiving a particular message (e.g., Neighbor Advertisement) indicating reachability from the particular neighbor UE (or router), UE considers that it is reachable during a reachable time. It has values ranging from 0 to 3,600,000 as millisecond unit values. When it is a value 0, it means that the router does not specify a reachable time, so the UE may use a certain value. After the reachable time has lapsed, the UE may receive a new Router Advertisement message or sends Neighbor Solicitation and receive a Neighbor Advertisement message in response, or the value may be reset (or refreshed0 through normal transmission and reception of user traffic such as TCP. |
| 10) Retrans Timer (32 bit) | It is used for Neighbor Unreachability Detection to detect whether or not a neighbor node (e.g., UE or router) is reachable. It indicates a time interval for retransmitting the Neighbor Solicitation message to know whether or not a particular neighbor UE (or router) is reachable. It has values ranging from 0 to ($2^{32}$-1) as millisecond unit values. When it is a value 0, it means that the router does not specify a reachable time, so the UE may use a certain value. |
| 11) Options | There are numerous options, and only the following options are described. Source link-layer address: Address of a source L2 layer (e.g., in case of a computer using windows system performing Ethernet communication, a MAC address is used). Prefix information option: Prefix information to be used in IPv6 SLAAC is transmitted. :In LTE, a method of allocating an IPv6 address through IPv6 SLAAC is used, so a router must use this option. |

As shown in Table 2, a router lifetime is included in the periodically transmitted RA message. When the value of the router lifetime expires, since it means that a lifetime for using the default router has lapsed, the UE 100 cannot transmit or receive data using the corresponding default router (i.e., PDN-GW).

To this end, in order to update the lifetime (i.e., Router Lifetime) for using the default router (i.e., the PDN-GW), the PDN-GW 400 should periodically transmit the RA message including an updated Router Lifetime value.

In this manner, when the value of the Router Lifetime expires, the UE 100 cannot transmit data to the PDN-GW 400 as a default router.

However, in the LTE system, when the UE know the router information once, since the PDN-GW is not changed unless the UE moves by a certain distance or larger, there is no need to perform the process of updating the router information for the 'Router Lifetime'. Namely, in the LTE system, the process of updating the router information due to the expiration of the 'Router Lifetime is overhead that wastes radio resource, and a bandwidth for transmitting and receiving user data is wasted. This may cause a degradation of QoS at the user side.

In particular, in the implementation of the LTE system in actuality, merely some PDN-GWs are operated in Seoul and the operation radius of each PDN-GW is large, so the PDN-GW is rarely changed although the UE moves. Thus, updating of the address of the PDN-GW as a default router due to the expiration of the Router Lifetime may be an operation that wastes network.

Also, fixed type UEs, e.g., fixedly operated equipment such as a vending machine, various sensor equipment (e.g., a power meter using mobile communication, a gas meter using mobile communication, or the like), and an access point (AP) which provides a WLAN service based on LTE mobile communication, do not move, so it does not happen that the PDN-GW is changed. Notwithstanding, performing, by the UEs, the process of updating the address of the PDN-GW as a default router due to the expiration of the Router Lifetime would be quite ineffective.

Figure 7:
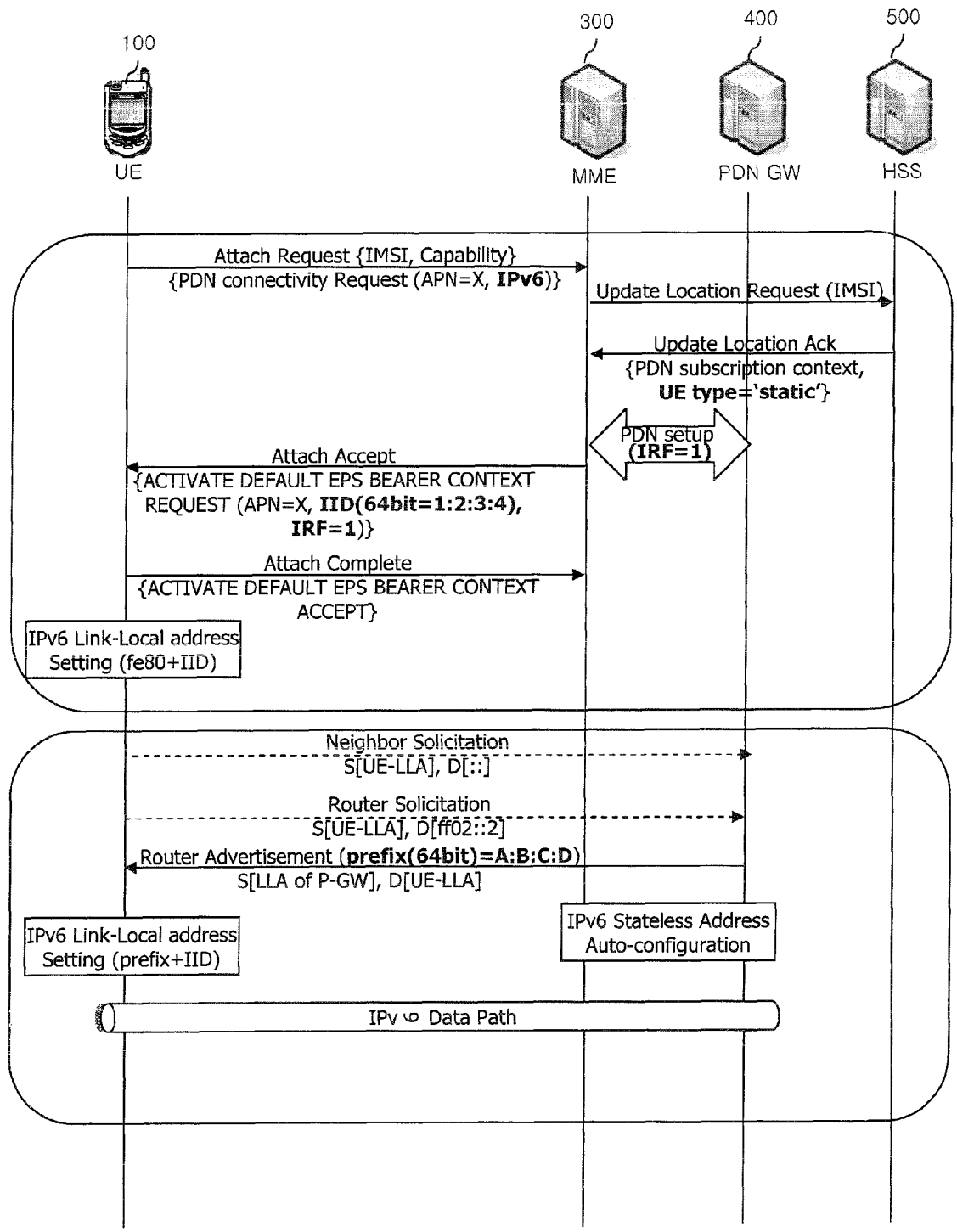
FIG. 7 is a signal flow chart illustrating a method of allocating an IPv6 according to an embodiment of the present invention.

Thus, in order to solve the problem, a different scheme is proposed in FIG. 7.

FIG. 7 is a signal flow chart illustrating a method of allocating an IPv6 according to an embodiment of the present invention.

Before explaining the scheme with reference to FIG. 7, the scheme will be briefly described as follows.

First, in an embodiment of the present invention, the value of 'Router Lifetime' included in the 'Router Advertisement' message is set to be almost permanent, so as not to perform the procedure of updating information of the PDN-GW corresponding to a default router unless the PDN-GW is changed as the UE geographically moves, thereby preventing a waste of radio resource and degradation of QoS.

To this end, the present invention proposes transmission of particular indication information to allow the UE to continuously use obtained router information. Such a particular indication information is exemplarily called Infinite Router Field (IRF) in an embodiment of the present invention. However, the name is not limited and any information may be included in the scope of the present invention so long as it is particular indication information allowing router information to be continuously used.

In detail, a particular entity, e.g., the MME 300, in the network may transmit the particular indication information (i.e., the IRF) allowing the information (e.g., an IP address0 of the router (e.g., the PDN-GW) allocated by the 'Router Advertisement' to the UE, regardless of the 'Router Lifetime' included in the 'Router Advertisement' message.

Thus, when the UE receives the particular indication information, although the value of the 'Router Lifetime' included in the 'Router Advertisement' message has expired, the information of the router may be continuously used so long as there is a connection with respect to the PDN or so long as the PDN-GW is not changed.

Alternatively, the UE 100 may not receive the particular indication information explicitly, and in this case, the UE 100 may continuously perform data transmission through the router at its discretion when there is a connection with respect to the PDN, although the value of the 'Router Lifetime' has expired.

The IRF may have a particular bit size, and Table 3 shows an example of a case in which the IRF is composed of 1 bit.

TABLE 3

| Value | Description |
|---|---|
| 0 | IPv6 operation according to RFC is performed. Namely, when 'Router Lifetime' has lapsed, data transmission/reception to the router cannot be made, and a lifetime value of the router may be updated by a new 'Router Advertisement' message |
| 1 | When the UE is allocated the IPv6 through the IPv6 SLACC procedure, the UE uses the obtained router information continuously up to a particular point in time (e.g., a PDN connection is cut off in the network), and continue to transmit and receive data by using the allocated IPv6 address. |

A method of transmitting the particular indication information, e.g., the IRF information, to the UE may include the following methods.

NAS signaling: For example, it may be transmitted as PDN address information, along with the IID, to the UE through ACTIVATE DEFAULT EPS BEARER CONTEXT REQUEST', or may be transmitted in the form of a separate information element to the UE.

System information: Measurement control variable information is transmitted through the system information. In this case, every UE served in the corresponding cell may manage an address according to the IRF in the same manner.

Paging; The IRF information may be transmitted to the UE through a page signal. Namely, like a paging record comprised of a paging reason, a UE identifier, and the like, the measurement control variable is included in the paging message and transmitted to the UE. In this case, when the paging record is included in the paging message, the UE performs the foregoing normal paging procedure according to the paging record, and when the IRF variable exists, the UE performs a corresponding operation. In case in which both the paging record information and the IRF information are included in the paging message, whether to perform both of the operations according to respective information or whether to perform only one of the operations may follow a definition of a system. In a different case, the IRF value may exist as content of the paging record. Also, the paging record and the IRF variable may be used together so only a particular UE may perform an operation according to the IRF according to a UE identifier as in the paging procedure.

L1/L2 control channel: It may transfer the IRF value to a channel that transfers control information like a PDCCH.

RRC signaling: IRF information may be transferred through signals in relation to a Measurement control message, Radio Bearer Setup, Radio Bearer Reconfiguration, RRC Connection Request/Connection Setup/Connection Release), RRC Connection Reconfiguration), RRC Connection Re-establishment), and the like.

The IRF information may also be transferred through a PDU such as an RLC, a MAC, a PDCP, or the like, and can be transferred according to every signal procedure of a network and a UE.

Reservation field of ICMP message

On the other hand, the following factors are used as a reference for transmitting the IRF information to the UE.

Subscriber information: a type (e.g., whether or not the UE is a mobile type UE ('mobile') which frequently moves geographically) or the UE is a fixed type UE ('static') which does not frequently move) in relation to UE mobility is stored in the subscriber information stored in the HSS 500, and then, the MME 300 obtains the subscriber information of the UE from the HSS 500 and determines whether to transmit the IRF according to the subscriber information.

UE capability information: When the UE 100 transmits its capability information to the network (e.g., 'Attach Request' in FIG. 6), the UE 100 transfers the type information in relation to the mobility frequency, and the MME 300 determines whether to transmit the particular indication information, e.g., the IRF, to the UE 100 on the basis of the information. In this case, the MME 300 may store the type in relation to the mobility frequency received from the UE in the HSS.

In the following description with reference to FIG. 7, for example, a case in which the particular indication information, e.g., the IRF, is included in a message of "ACTIVATE DEFAULT EPS BEARER CONTEXT REQUEST" and transmitted will be described. When the UE receives the particular indication information, e.g., the IRF, if a value of the IRF is 1, the UE maintains the obtained address information of the default router (PDN-GW), regardless of expiration of the 'Router Lifetime' within the Router Advertisement message. This will be described in detail as follows.

1) First, in order to receive a data service, the UE 100 transmits an Attach Request message including one or more of its identification information, e.g., an IMSI (International Mobile Subscriber Identify), and information regarding its capability to the MME 300. The information regarding the capability is included in the Attach Request message in order to inform the MME 300 about the characteristics of the UE 100. The information regarding the capability may be, for example, a ciphering algorithm to be used for a data transmission and reception.

Meanwhile, the Attach Request message may include a PDN Connectivity Request message. The PDN Connectivity Request message includes an APN and a PDN type parameter. The PDN type parameter may include requested IP version information, e.g., IPv6.

2) In order to register a current location of the UE 100, the MME 300 performs registration by transmitting UE information, e.g., identification information, to the HSS (Home Subscriber Server) 500.

3) Then, the HSS 500 transfers a location update response message including the subscriber information of the UE, e.g., Update Location Ack message, to the MME 300 on the basis of the UE information. The subscriber information may be, for example, an IP address that may be used by the UE, a PDN type, and the like. In this case, the subscriber information may include a type of the UE, e.g., information indicating movement frequency. For example, the subscriber information may include a value 'static' as a type of the UE.

4) Then, the MME 300 enables the PDN GW 400 and the S-GW (not shown) to generate a default bearer on the basis of the received subscriber information (e.g., PDN type) and the connection information (e.g., PDN type) requested by the UE. The MME 300 obtains an IID (Interface ID) included in the information for the UE 100, e.g., the address of IPv6. Here, as described above, since the UE has requested IPv6, the PDN GW 400 allocates the IID of the address of the IPv6 to the UE.

At this time, the MME 300 checks the type of the UE from the subscriber information obtained from the HSS 500, and when the checked type of the UE is 'static', the MME 300 transmits particular indication information (i.e., IRF) allowing the information (e.g., the IP address) of the router (e.g., the PDN GW) to be used without a time restriction, to the P-GW 400.

Alternatively, the subscriber information obtained from the HSS 500 may not include the type of the UE. In this case, the MME 300 may determine whether or not the UE 100 frequently moves or exists at a fixed location on the basis of the TAU (Tracking Area Update) frequency of the UE. And, accordingly, the MME 300 transmits the particular indication information (i.e., the IRF) allowing the router information (e.g., the IP address) to be used without a time restriction to the P-GW.

Subsequently, the MME 300 transmits the Attach Accept message to the UE 100. The Attach Accept message may include a Activate Default EPS Bearer Context Request. The Activate Default EPS Bearer Context Request message may include an APN and an IID (Interface ID).

At this time, as mentioned above, when the checked type of the UE is 'static', the MME 300 includes the particular indication information (i.e., the IRF) allowing the information (e.g., IP address) of the router (e.g., the PDN GW) to be used without a time restriction in the Activate Default EPS Bearer Context Request message.

5) When the Attach Accept message is received, the UE 100 transmits an Attach Complete message to the MME 300. The Attach Complete message may include the Activate Default EPS Bearer Context Accept message.

And, the UE 100 checks the Activate Default EPS Bearer Context Request message included in the Attach Accept message, and generates an 128-bit IPv6 address (64 bit prefix+64 bit IID) by using the 64-bit IID (Interface ID) and a certain 64-bit prefix (e.g., fe80::).

6) When the IPv6 address is generated, the UE 100 may perform a procedure, i.e., Duplicate Address Detection (DAD), for confirming whether or not the generated address does not overlap with an adjacent UE according to an RFC standard.

7) In order to check a router, the UE 100 selectively transmits a Router Solicitation (RS) message to the P-GW 400, and receives a Router Advertisement (RA) message from the P-GW 400. The RA message may include an address of the P-GW 400 as a source address, and include the LLA of the UE as a destination address. The RA message may include a prefix of IPv6.

8) Meanwhile, the UE 100 generates a 128-bit global address by using the 64-bit prefix value included in the received RA message and the allocated 64-bit IID value.

In this case, although the Router Lifetime is included in the Router Advertisement (RA) message, the UE 100 disregards the value of the Router Lifetime on the basis of the particular indication information, e.g., the IRF. Thus, although the RA message including the value of the Router Lifetime is received, the UE disregards the RA message.

Meanwhile, although the value of the Router Lifetime expires, the P-GW 400 does not perform a process of updating the router information on the basis of the received particular indication information (e.g., the IRF). Thus, although the value of the Router Lifetime expires, the P-GW 400 does not transmit the RA message to the UE, and thus, radio resource of, the network can be effectively used.

Meanwhile, it has been described that, when the UE moves, if the PDN GW is not changed, although the Router Lifetime expires, the default router information is maintained to be used. However, although the PDN GW serving the UE is changed due to a movement of the UE, when the old PDN GW and a new PDN GW can interwork and the context of the UE including the IP information is maintained, the UE is able to maintain the IP session, so it can use the allocated IPv6 address and the default router information as it is. Thus, in this case, although the Router Lifetime expires, the default router information may be maintained to be used.

Meanwhile, it has been described that the type information of the UE is included in the subscriber information in the HSSs 500 and the MME 300 obtains the subscriber information and determines whether to transmit the particular indication information to the UE and the P-GW. However, alternatively, when the UE is an MTC (Machine Type Communication) device, MTC subscriber information may be included in the subscriber information in the HSS 500. And, when the UE 100 includes an indicator, e.g., an MTCa device indicator, indicating that the UE 100 is an MTC device in the Attach Request message and transmits the same, the MME 300 obtains the subscriber information from the HSS. The subscriber information includes the MTC subscriber information. The MTC subscriber information includes information indicating whether or not the UE is a fixed type UE or a mobile UE. Thus, the MME 300 may determine whether to transmit the particular indication information to the UE and the P-GW on the basis of the MTC subscriber information.

In another method, according to whether or not the UE has subscribed to a particular MTC feature included in the MTC subscriber information, the MTC subscriber information may be utilized when it is determined whether to transmit the particular indication information to the UE and the P-GW. Namely, the MTC subscriber information may be configured in various manners such that it indicates an MTC device managed by a particular MTC device group ID, indicates that the UE has subscribed to an MTC monitoring feature, or indicates that the corresponding feature is allowed to operate only during a particular permitted time, and the MTC subscriber information may be utilized in determining the particular indication information.

Here, the MTC refers to communication performed between devices without a human's intervention. The MTC device may have a mobile communication function and may be a bending machine, sensor equipment, or the like.

Figure 8:
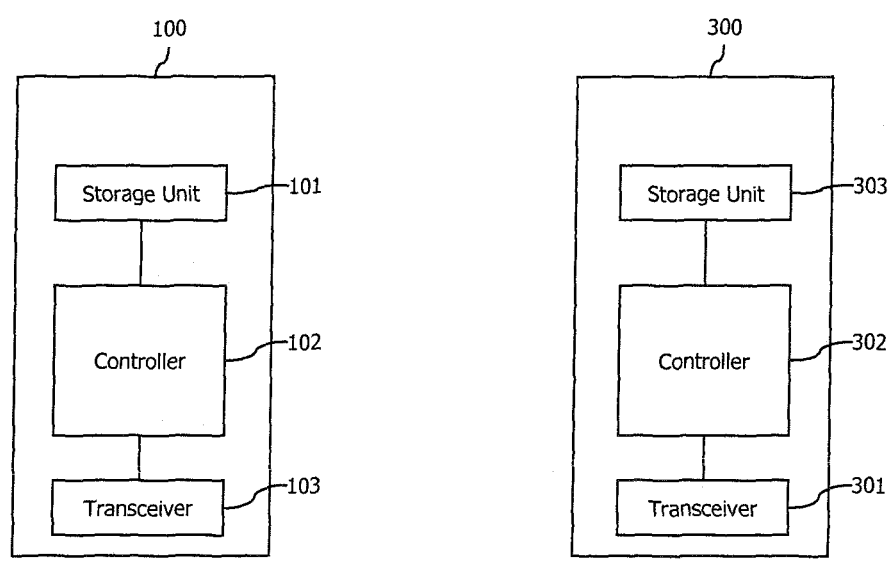
FIG. 8 is a schematic block diagram of a UE 100 and an MME 300 according to an embodiment of the present invention.

FIG. 8 is a schematic block diagram of a UE 100 and an MME 300 according to an embodiment of the present invention.

As shown in FIG. 8, the UE 100 includes a storage unit 101, a controller 102, and a transceiver unit 103. The MME 300 includes a storage unit 303, a controller 302, and a transceiver unit 301.

The storage units 101 and 303 store the method illustrated in FIGS. 6 and 7.

The controllers 102 and 302 control the storage units 101 and 303 and the transceiver units 103 and 301. In detail, the controllers 102 and 302 execute the methods stored in the storage units 101 and 303, respectively. The controllers 102 and 302 transmit the foregoing signals through the transceiver units 103 and 301, respectively.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

The invention claimed is:

1. A method of allocating an Internet protocol (IP) address in a mobile communication system, the method comprising:
    receiving a packet data network (PDN) connection request message from a user equipment (UE), the PDN connection request message including one or more of version information indicating a requested IP version and information regarding capability of the UE;
    obtaining subscriber information of the UE from a subscriber information server in response to reception of the PDN connection request message;
    checking the IP version information included in the PDN connection request message; when an address of IP version 6 (IPv6) is requested according to the checking of the version information, determining whether or not the UE moves frequently or is stationary on the basis of one or more of the subscriber information of the UE, the capability information of the UE, and a tracking area update (TAU) frequency; and
    when the UE is stationary, transmitting to the UE a request message including particular indication information indicating to maintain router information, although a timer with respect to the router information has expired, as long as the UE belongs to a particular PDN gateway, and information corresponding to an interface identity (ID) allocated for the UE,
    wherein the interface ID is used to configure the address of IPv6 for the UE, wherein the particular indication message is composed of 1 bit,
    when a value of the particular indication message is 0, the UE is configured to be updated by receiving a router advertisement message including a router lifetime value, and
    when the value of the particular indication message is 1, the UE is configured to use the router information until a connection with the particular PDN gateway is released.

2. The method of claim 1, wherein the subscriber information of the UE further includes a parameter indicating a type of the UE, and the parameter indicates whether or not the UE is a static type UE that does not move or a mobile type UE that moves frequently.

3. The method of claim 1, wherein the capability information further includes a parameter indicating a type of the UE, and the parameter indicates whether or not the UE is a static type UE that does not move or a mobile type UE that moves frequently.

4. The method of claim 1, wherein the PDN connection request message is included in an Attach Request message and received.

5. The method of claim 1, wherein the transmitted request message is an Activate Default evolved packet system ('EPS') Bearer Context Request message, and the Activate Default EPS Bearer Context Request message is included in an Attach Accept message and received.

6. The method of claim 1, further comprising: receiving an Attach Complete message from the UE.

7. The method of claim 1, wherein the PDN connection request message further includes an access point name (APN).

8. The method of claim 1, further comprising:
    when the UE does not move, transmitting the particular indication information indicating to maintain router information, although a timer with respect to the router information has expired, as long as the UE belongs to a particular PDN gateway, to the PDN gateway,
    wherein the transmitting of the request message to the UE and the transmitting of the particular indication information to the PDN gateway are simultaneously performed, or the transmitting of the request message to the UE is performed before the transmitting of the particular indication information to the PDN gateway or is performed after the transmitting of the particular indication information to the PDN gateway.

9. A method of receiving an allocated Internet protocol (IP) address by a mobile communication user equipment (UE), the method comprising:
    transmitting, by the mobile communication UE, a packet data network (PDN) connection request message, to an entity in a network, the PDN connection request message include one or more of version information indicating an IP version requested by the mobile communication UE and information regarding capability of the UE;
    receiving, from the network entity, a request message including particular indication information indicating to maintain router information, although a timer with respect to the router information has expired, as long as the UE belongs to a particular PDN gateway, and information corresponding to an interface identity (ID);

transmitting, by the mobile communication UE, an accept message to the network entity; generating, by the mobile communication UE, a link local address (LLA) by using the interface ID;

receiving a router advertisement message from a router in the network, the router advertisement message including information regarding a prefix address part of an address of IP version 6 (IPv61) the router information, and a lifetime information regarding the router information;

setting an address of IPv6 by using the prefix address and the interface ID; and transmitting uplink data to the router on the basis of the particular indication information although the lifespan with respect to the router information has expired, wherein the particular indication message is composed of 1 bit, when a value of the particular indication message is 0, the UE is configured to be updated by receiving a router advertisement message including a router lifetime value, and when the value of the particular indication message is 1, the UE is configured to use the router information until a connection with the particular PDN gateway is released.

10. The method of claim 9, wherein the capability information further includes a parameter indicating a type of the UE, and the parameter indicates whether or not the UE is a static type UE that does not move or a mobile type UE that moves frequently.

11. The method of claim 10, wherein the PDN connection request message is included in an Attach Request message and received.

12. The method of claim 10, wherein the received request message is an Activate Default evolved packet system/EPS) Bearer Context Request message, and the Activate Default EPS Bearer Context Request message is included in an Attach Accept message and received.

13. The method of claim 10, wherein the PDN connection request message further includes an access point name (APN).

14. A control entity of a network, the control entity comprising: a transceiver configured to transmit and receive a signal; and a processor configured to control the transceiver, wherein the processor is further configured to receive a packet data network PDN connection request message including one or more of version information indicating an Internet protocol (IP) version requested from a mobile communication user equipment (UE) and information regarding a capability of the UE;

obtain subscriber information of the UE from a subscriber information server in response to the reception of the PDN connection request message;

check IP version information included in the PDN connection request message;

determine whether or not the UE moves frequently or is stationary on the basis of one or more of the subscriber information of the UE, the capability information of the UE, and a tracking area update (TAU) frequency; and when the UE is stationary, transmit to the UE a request message including particular indication information indicating to maintain router information, although a timer with respect to the router information has expired, as long as the UE belongs to a particular PDN gateway, and information corresponding to an interface identity (ID) allocated for the UE, wherein the interface ID is used to configure the address of IP version 6 (IPv6) for the UE, wherein the particular indication message is composed of 1 bit, when a value of the particular indication message is 0, the UE is configured to be updated by receiving a router advertisement message including a router lifetime value, and when the value of the particular indication message is 1, the UE is configured to use the router information until a connection with the particular PDN gateway is released.

15. The control entity of claim 14, wherein the control entity is a mobility management entity.

16. The control entity of claim 14, wherein when the UE does not move, the processor is further configured to:

transmit, to the particular PDN gateway, the particular indication information indicating to maintain router information, although a timer with respect to the router information has expired, as long as the UE belongs to the particular PDN gateway, wherein the transmission of the request message to the UE and the transmission of the particular indication information to the particular PDN gateway are simultaneously performed, or the transmission of the request message to the UE is performed before the transmission of the particular indication information to the particular PDN gateway or is performed after the transmission of the particular indication information to the PDN gateway, wherein the particular indication message is composed of 1 bit, and when a value of the particular indication message is 0, the UE is configured to be updated by receiving a router advertisement message including a router lifetime value, and when the value of the particular indication message is 1, the UE is configured to use the router information until a connection with the particular PDN gateway is released.

* * * * *